Sept. 20, 1971     F. KNECHT     3,605,343
MACHINE FOR PROCESSING OF KNIVES, IN PARTICULAR OF
CUTTER KNIVES AND CARVING KNIVES
Filed Dec. 11, 1969     3 Sheets-Sheet 1
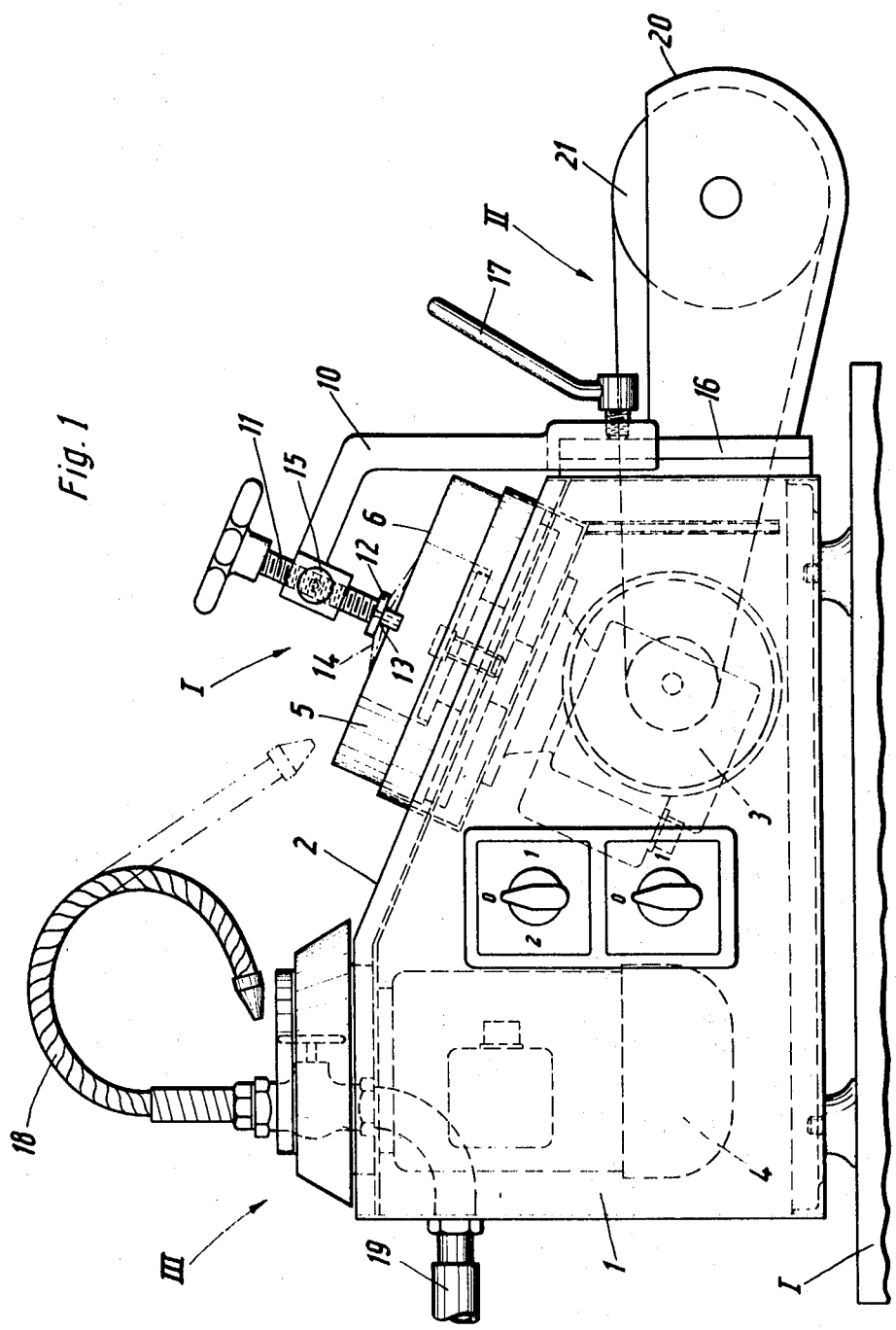
Inventor:
Fritz Knecht

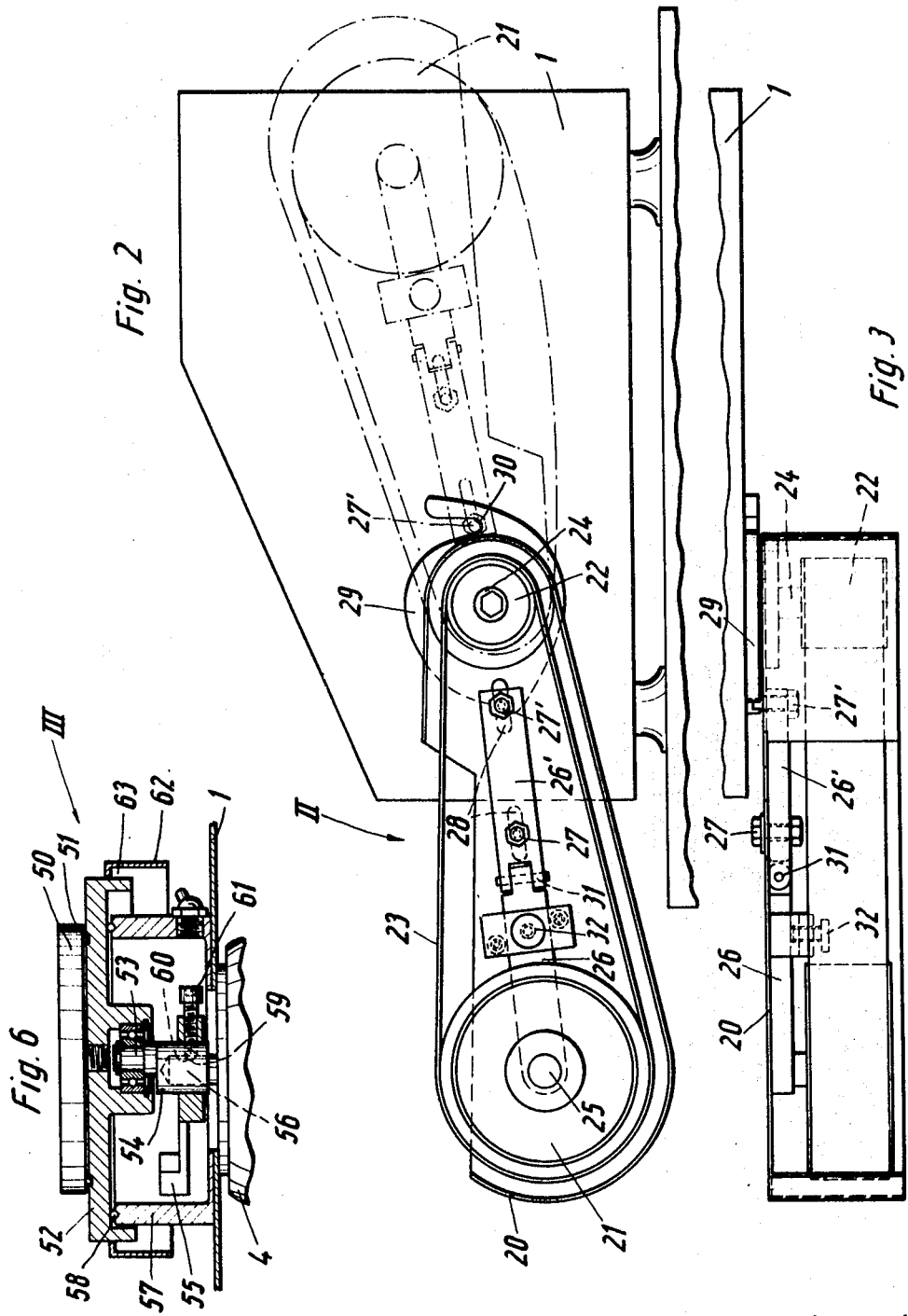

United States Patent Office 3,605,343
Patented Sept. 20, 1971

3,605,343
MACHINE FOR PROCESSING OF KNIVES, IN PARTICULAR OF CUTTER KNIVES AND CARVING KNIVES
Fritz Knecht, Mottelinstrasse,
D-798 Ravensburg, Germany
Filed Dec. 11, 1969, Ser. No. 884,198
Claims priority, application Germany, Dec. 14, 1968,
P 18 14 799.4
Int. Cl. B24b 7/00
U.S. Cl. 51—3       12 Claims

ABSTRACT OF THE DISCLOSURE

A machine for processing of knives particularly of cutter knives and knife-blades having a handle, which comprises a housing including an inclined face and an upper horizontal face, as well as a vertical part. A grinding device, a band grinding device including a grinding band and a lap device are provided. The housing receives the devices and the grinding device is rotatably mounted on the inclined face of the housing. The lap device includes a lap disk and is disposed on the upper horizontal face of the housing. A drive shaft is mounted in the housing and the grinding band is disposed on the vertical housing part, and swingably mounted parallel to the wall of the housing about the axis of the drive shaft.

---

The present invention relates to a machine for processing of knives, in particular of cutter knives and carving knives and knife blades with a handle, respectively.

In the known machines, either a separate unit has been set up or combined units have been produced, which are, however, not handy due to their large dimensions and which require a large space.

Furthermore, also the individual units require an improvement, particularly for special tasks as boning and laping of cutter knives, which relates in particular to the handling of the devices and their mode of operation.

It is one object of the present invention to provide a machine for processing of knives, in particular of cutter knives and carving knives and knife blades with a handle, wherein the drawbacks of the known devices are avoided and which brings about appreciable improvements as to structure and to function.

It is another object of the present invention to provide a machine for the working or the processing of knives and in particular of cutter knives, and blades with a handle, with includes a grinding disk, a grinding band and a lap device, each with a driving motor and accessory in and on, respectively, joint disk-like housing, having an inclined top face, whereby the grinding disk rotates on the inclined top face of the desk, while the lap disk is disposed on an upper horizontal face and the grinding band disposed on the vertical housing part is swingable, parallel to the housing wall about the axis of its driving shaft.

In accordance with the present invention, the holding devices for the cutter knives and for other knife types are exchangeable relative to each other on the housing by adjustment as to their height and fixable, whereby always the same guide is usable on the housing.

This joining and particular arrangement of a plurality of units in one housing results, compared with the previous arrangement, an appreciably more rational working method in grinding and adjusting of knives. Furthermore, the individual units are joined together in a space saving manner, so that a table device results, which can be set up in small spaces.

Figure 4:
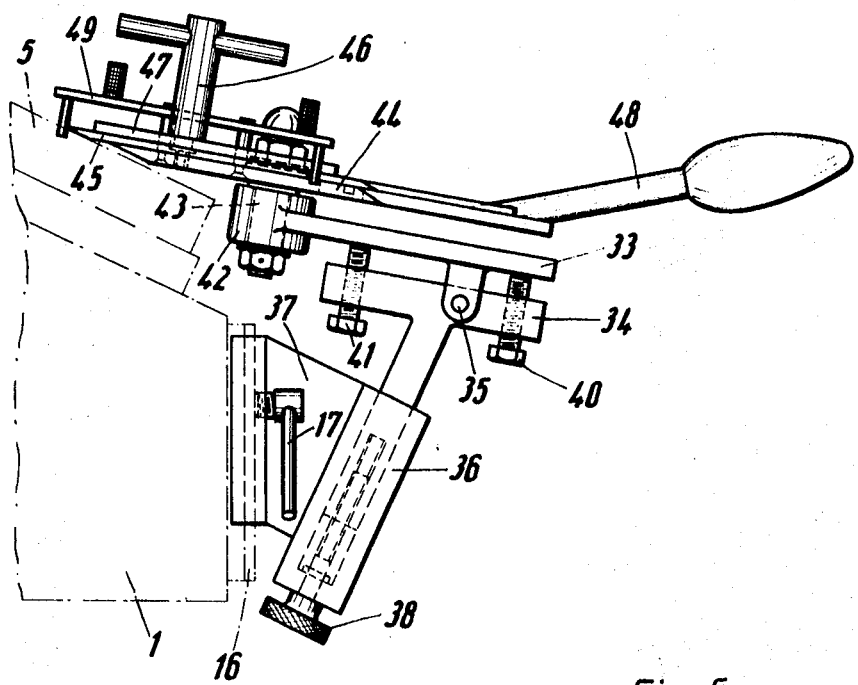
Figure 5:
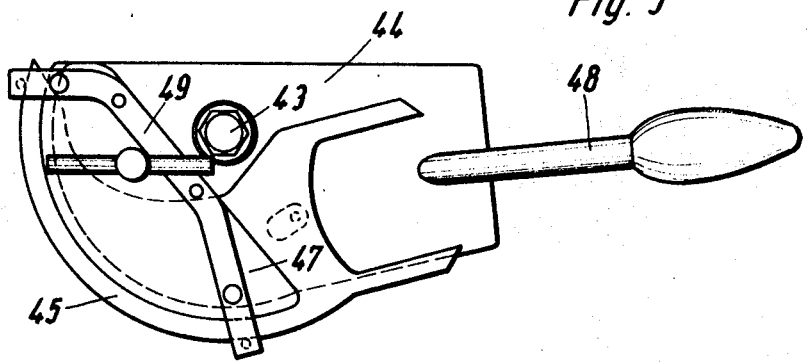

With these and other objects in view, which will become apparent in the following detailed description, the present invention, which is shown by example only, will be clearly understood in connection with the accompanying drawings in which:

FIG. 1 is a side elevation of the complete machine;
FIG. 2 is a side elevation disclosing the other side of the housing with a grinding band unit;
FIG. 3 is a top plan view of the unit as reported in FIG. 2;
FIG. 4 is a side elevation of the mounted holding device for cutter knives;
FIG. 5 is a top plan view of the holding device set forth in FIG. 4; and
FIG. 6 is a section of the lap device.

Referring now to the drawings, the housing 1, set up on a table plate T, which has a desk-like inclination 2 towards one side, is the carrier of the individual units, namely of the grinding device I, of the band grinding device II and of the lap device III, whereby the motor 3 can be operated in both directions of rotation.

The unit I serves for grinding of knife edges and is equipped with a grinding disk 5, the end side 6 which is used as a grinding face. The disk 5 is secured, in accordance with the present invention, at its engagement, with the intermediate arrangement of compensation disks, whereby the grinding disk wear can be compensated.

A carrier 10 is provided, into which, in accordance with the present invention, a screw spindle 11 is screwably secured, at the lower end of which a hardened roller 12 is provided, which is equipped with a groove 13, for the support of the knife blade 14.

By this arrangement, depending upon the position of height of the roller 12, the grinding angle of the knife is set and can be maintained during the grinding. The spindle 11 is securable by means of a set screw 15. The carrier 10 is fixed to a holding ledge 16 of the housing 1 by means of the stick screw 17.

The cooling and grinding fluid, respectively, is fed by means of a hose 18 from the conduit 19.

On a vertical side wall of the housing 1 is disposed the band grinding device as a unit II (FIGS. 2 and 3). The latter comprises substantially two band rollers 21 and 22 and a grinding band 23.

The roller 22 is driven by a shaft 24, and the roller 21 is mounted with the shaft 25 in a cantilever 26. The latter is secured to the protecting housing 20 by means of screws 27 and 27', whereby the screws are guided in longitudinal slots 28 of the housing, so that the cantilever arm is displaceable in radial direction to the rollers 21 and 22. This displacement is controlled, in accordance with the present invention, by a cam disk 29, which is secured to the housing 1 and is arranged such, that the rollers 21 and 22 have their greatest distance from each other in its operating state, so that the band 3 is tensioned. In the resting position, shown in pointed-dotted lines, the cantilever arm 26 and 26' swings inwardly with the roller 21 about the axis of the shaft 24, whereby the screw bolt 27' has been guided by means of the cam disk 29 closer towards the rotating axis. By this arrangement the roller distance is reduced and the band can be released to an extent, that the roller 22 driven by the motor 3 cannot be uncoupled, since it can idle, without driving the band. In accordance with the present invention, the cam disk 29 is equipped with a rest recess 30, in which the bolt 27' is fixed in its resting position.

Furthermore, in accordance with the present invention, the part 26 of the cantilever arm carrying the roller, is connected by means of a pivot 31 with the other cantilever arm 26'. The swingable part 26 can be adjusted by means of a screw 32 perpendicularly to the rotation plane of the roller 21, so that the position of the grinding band can be corrected at any time.

In order to use the unit I for grinding cutter knives, in accordance with FIGS. 4 and 5, a corresponding clamping and guiding device is provided on the holding ledge 16 of the housing 1 adjustable as to its height. The guiding device has, in accordance with the present invention, a carrying plane 33 which is connected with a carrier 34 vertically swingable to the grinding plane, screwable by means of a pivot 35. The carrier 34 is guided in one eye 36 of the console 37 and is finally adjustable as to its height by means of a set screw 38.

For the setting of the grinding angle serve, in accordance with the present invention, two pressure screws 40 and 41, which are screwable in the carrier 34 and which support themselves on the carrying plate 33. The latter carries in a hub 42 the swinging pin 43, on which the engaging plate 44 for the cutter knife 45 is secured. The latter is clampable by means of the stick screw 46 over a clamping plate 47 with the engaging plate 44 and can swing back and forth by means of a hand lever 48 during grinding about the pin 43.

Prior to the clamping of the cutter knife 45 its position is centered by means of a gage 49, whereby after the clamping the grinding disk 5 can be put into operation.

After a cutting edge is ground on the cutter knife, the cutting edge is boned and lapped, respectively, on the unit III (FIG. 6). In accordance with the present invention, the lap disk 50 is connected with the carrying body 52 with the intermediate arrangement of an O-ring 51, which carrying body 52 is rotatably mounted on a pin 53 of an eccentric 54. The latter is equipped with a balancing weight 55 and is connected by means of a shaft 56 with the motor 4. The carrying body 52 supports itself on the cylindrical socket 57 on the housing 1. An O-ring 58 is provided thereby between the socket 57 and the carrying body 52, so that a forced connection between these two parts exists. By this arrangement it is brought about that the lap disk 50 performs in addition to the eccentric movement also a circular movement about the pin 53, so that the lap disk describes a cycloid-like path, whereby the lap process is very much favored. The bringing about of the circular movement about the pin 56 requires, however, the presence of a certain friction between the O-ring and the carrying body 52. In order to adjust this friction, in accordance with the present invention, the pin 56 is equipped with a wedge-like notch 59, into which the point of a set screw 61 sitting in the eccentric 54, projects, whereby the point is equipped with a wedge face 60. By this arrangement the carrying body 52 can be pressed more or less to the O-ring 58 and the coupling effect can be varied. Furthermore, in case of wear of the O-ring the required aftersetting can be performed.

In order to avoid the penetration of water, soiled with particles, in accordance with the present invention, the rotating carrier body 52 is equipped with a downwardly projecting jacket ring 62, which forms at its engaging point at the carrying body a receiving niche 63.

The described grinding machine is characterized particularly by its simplicity, low space requirement and operational safety. The possibility of application is not limited to the shown examples. In proper holding devices, also other types of knife blades can be ground and lapped in addition to those mentioned above.

While I have disclosed one embodiment of the present invention, it is to be understood that this embodiment is given by example only and not in a limiting sense.

I claim:

1. A machine for processing of knives particularly of cutter knives and knife-blades having a handle, comprising:
    a housing including an inclined face and an upper horizontal face, as well as a vertical part,
    a grinding device,
    a band grinding device including a grinding band,
    a lap device,
    said housing receiving said devices,
    said grinding device being rotatably mounted on said inclined face of said housing,
    said lap device including a lap disk and being disposed on said upper horizontal face of said housing,
    a drive shaft mounted in said housing,
    said grinding band being disposed on said vertical housing part, and swingably mounted parallel to the wall of said housing about the axis of said drive shaft.

2. The machine, as set forth in claim 1, which includes:
    holding devices exchangeably adjustable to their height and fixable to said housing for knives and
    a guide means secured to said housing for said holding devices.

3. The machine, as set forth in claim 2, wherein:
    said holding devices for said knife are swingable concentrically to the cutting edge and includes a carrying plate,
    a carrier,
    said carrying plate is pivotally secured to said carrier vertically swingably to the grinding plane,
    a pressure screw disposed on said carrier on opposite sides of said pivot,
    said pressure screws supporting themselves on said carrier plate, thereby providing a changeable setting of the angle between said carrier plate and said plane of the grinding disk and thereby the grinding angle of said knife.

4. The machine, as set forth in claim 3, which includes:
    a gage applied for clamping said knife, with which the edge of the circular arch concerning the swinging point of said carrying plate can be concentrically aligned.

5. The machine, as set forth in claim 2, wherein:
    said holding devices for knives with a handle comprises a hardened steel roller,
    a threaded spindle,
    said steel roller is disposed at the lower end of said threaded spindle screwable in said carrier perpendicularly to the plane of the grinding disc and has a groove adapted to the support of the back of said knife, while the grinding takes place on the end face of said grinding disk.

6. The machine, as set forth in claim 5, which includes:
    compensation discs of predetermined strength are insertable between said grinding disk and its support, for compensation of wear.

7. The machine, as set forth in claim 1, wherein:
    said band grinding device comprises an outer and an inner guiding roller,
    a cantilever,
    said outer guiding roller is mounted at the outer end of said cantilever,
    a cam disk,
    the inner end of said cantilever supporting itself at said cam disk,
    said inner end of said cantilever is arranged such, that in the swing-in state of said cantilever the distance of said guiding roller is smaller than the distance of said guiding rollers in their operative position, so that said band hangs loosely on said guiding rollers.

8. The machine, as set forth in claim 7, wherein:
    said cam disk has a resting groove,
    a guide means for resting said cantilever in said resting groove in its resting position, thereby obtaining a fixing of the resting position.

9. The machine, as set forth in claim 7, wherein:
    one of said guiding rollers is driven,
    said cantilever comprises two parts, one of said parts carrying said driven guiding roller is swingably connected with the other of said parts perpendicularly to the rotating plane of said roller, and a screw effective to the swingable part performing a correction of the position of said grinding band.

10. The machine, as set forth in claim 1, wherein:

said lap disk for bonding and lapping is guided in an eccentric path and simultaneously in a rotating movement about its central axis, an eccentrically driven carrying body for said lap disk, an O-ring connecting forcibly said carrying body for said lap disk with said housing, so that a cycloid-like movement is created.

11. The machine, as set forth in claim 10, wherein:

said drive shaft for said carrying body is equipped with a wedge-like notch into which a point of a set screw sitting in said eccentric of said carrying body penetrates, said point being equipped with a wedge face, so that the engagement pressure of said carrying body on said O-ring is adjustable.

12. The machine, as set forth in claim 10, wherein:

said rotating carrier body has a downwardly projecting jacket ring for the protection against penetration of grinding water, and said jacket ring forms at its engagement point on said carrying body a receiving niche.

References Cited

UNITED STATES PATENTS

| | | | |
|---|---|---|---|
| 987,589 | 3/1911 | Mummert | 51—3 |
| 2,948,088 | 7/1960 | Jepson | 51—3 |
| 2,780,897 | 2/1957 | Radase | 51—3 |

WILLIAM R. ARMSTRONG, Primary Examiner

U.S. Cl. X.R.

51—135R, 148